US012060515B2

(12) United States Patent
Jakli et al.

(10) Patent No.: US 12,060,515 B2
(45) Date of Patent: Aug. 13, 2024

(54) ELECTRICALLY TUNABLE REFLECTION COLOR OF CHIRAL FERROELECTRIC NEMATIC LIQUID CRYSTALS

(71) Applicants: Antal Jakli, Kent, OH (US); Chenrun Feng, Kent, OH (US)

(72) Inventors: Antal Jakli, Kent, OH (US); Chenrun Feng, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 17/949,516

(22) Filed: Sep. 21, 2022

(65) Prior Publication Data

US 2024/0110100 A1 Apr. 4, 2024

Related U.S. Application Data

(60) Provisional application No. 63/246,882, filed on Sep. 22, 2021.

(51) Int. Cl.
*C09K 19/58* (2006.01)
*C09K 19/02* (2006.01)
*C09K 19/20* (2006.01)

(52) U.S. Cl.
CPC ........ *C09K 19/584* (2013.01); *C09K 19/0225* (2013.01); *C09K 19/025* (2013.01); *C09K 2019/2078* (2013.01)

(58) Field of Classification Search
CPC .......................... C09K 19/0225; C09K 19/025
See application file for complete search history.

(56) References Cited

FOREIGN PATENT DOCUMENTS

WO WO-2022089501 A1 * 5/2022 ............ C09K 19/20

OTHER PUBLICATIONS

English translation of WO2022089501. (Year: 2022).*

Ortega, J., "Ferroelectric chiral nematic liquid crystals: new photonic materials with multiple bandgaps controllable by low electric fields", Aug. 8, 2022, Liquid Crystals, vol. 49 No. 15, 2128-2136. (Year: 2022).*

Lub, J.,"Photoisomerizable chiral compounds derived from isosorbide and cinnamic acid", Aug. 2005, Liquid Crystals, vol. 32 No. 8, 1031-1044. (Year: 2005).*

* cited by examiner

*Primary Examiner* — Chanceity N Robinson
*Assistant Examiner* — Anna Malloy
(74) *Attorney, Agent, or Firm* — RENNER KENNER GREIVE BOBAK TAYLOR & WEBER

(57) ABSTRACT

A doped ferroelectric nematic liquid crystal includes a chirality-induced stabilization of the polar nematic order, improved relaxation time for electro-optical switching, and selective reflection in the visible wavelength that is reversibly tunable. The ferroelectric nematic liquid crystal is doped with a chiral dopant selected from benzoic acid, 4-hexyl-,4-[[(1-methylheptyl)oxy]carbonyl]phenyl ester (ZLI811) and BDH1281.

15 Claims, 2 Drawing Sheets

MeO OMe O O O O $NO_2$ RM734

$C_6H_{13}$ O O O O O $CH_3$ $C_6H_{13}$ ZLI811

ELECTRICALLY TUNABLE REFLECTION COLOR OF CHIRAL FERROELECTRIC NEMATIC LIQUID CRYSTALS

STATEMENT REGARDING FEDERALLY SPONSORED RESEARCH OR DEVELOPMENT

This invention was made with government support under DMR-1904167 awarded by National Science Foundation. The government has certain rights in the invention.

FIELD OF THE INVENTION

The present invention generally relates to ferroelectric materials with electrically switchable spontaneous polarization. The present invention specifically relates to ferroelectric nematic liquid crystals with over 0.04 C/$m^2$ ferroelectric polarization and $10^4$ relative dielectric constants. The present invention more specifically relates to 4-[(4-nitrophenoxy)carbonyl]phenyl2,4-dimethoxybenzoate (RM734) doped with non-polar chiral dopants having the over 0.04 C/$m^2$ ferroelectric polarization and $10^4$ relative dielectric constants.

BACKGROUND OF THE INVENTION

Over the past few decades, ferroelectric materials with electrically switchable spontaneous polarization have been utilized in energy storage devices, piezoelectric sensors, thermistors, nonvolatile memory, and electro-optic devices. Fluid-like ferroelectric liquid crystals (FLCs) are promising for sub-millisecond electro-optic modulators and display panels. However, until recently ferroelectricity was observed only in the smectic and columnar phases, which are fluid only in one or two dimensions, respectively. Due to their piezoelectricity, they deform mechanically during electric switching, eventually leading to permanent defects in the layers or columns.

3-dimensional nematic fluids with large molecular dipole moments along the long axis of rod-shaped molecules were predicted to be ferroelectric in the 1910s by; similar predictions were made later for disc-shaped and pear-shaped LCs. In 2017, over a century later, researchers found the first evidence of ferroelectric nematic phase ($N_F$) in a strongly polar 1,3-dioxane-based rod-shaped material, DIO. That same year, a nematic (N)-splay nematic (Ns) transition was reported in another highly polar nematic material, 4-[(4-nitrophenoxy)carbonyl]phenyl2,4-dimethoxybenzoate (RM734). The lower temperature phase was later proposed to be a splay nematic, with the splay deformation being the result of polar molecular ordering.

Recently, it was argued that this polar ordering does not couple to a splay deformation, but instead, the lower temperature phase is a uniform ferroelectric nematic with a spontaneous polarization as high as 6 C/$cm^2$. The large polarization values up to 4-6 $\mu$C/$cm^2$ measured on DIO and on RM734 indicates a strong polar order, which is the primary order parameter, similarly to the polar subphases (SmAP and SmCP) of bent-core smectic LCs. The large ferroelectric polarization and dielectric constant, coupled with sub-millisecond switching, offer potential applications such as high-power super capacitors and low voltage driven fast electro-optical devices. The electro-optical properties of RM734 were recently shown to depend strongly on the surface treatments of the samples, namely that the polarity of surface anchoring may couple to the bulk polar order parameter and lead to oppositely twisted domains. To obtain a uniform texture, one needs to bias the twist by adding chiral dopants to the system The presence of molecular chirality in liquid crystals typically leads to a helical director structure. In conventional nematic materials the twist elastic constant $K_{22}$ is smaller than the splay elastic constant $K_{11}$ and the bend elastic constant $K_{33}$ and the director n is perpendicular to the helix axis. The director n is a dimensionless unit vector introduced to represent the direction of the preferred orientation of molecules in a nematic liquid crystal. More than 50 years ago it was predicted that chiral nematic N* materials with $K_{33}<K_{22}$ should have very distinct responses to external influences and the director n should make an acute angle with the helix axis above a certain electric or magnetic threshold field. In the case of RM734, it was shown that $K_{11}<K_{22}$ and $K_{33}>K_{22}$, which indicated a rectangular helical structure with director n angle being 90°. Very recently it was reported that the coupling of local ferroelectric ordering to rectangular chiral helicity when chiral analogs of RM734 are mixed with the achiral RM734. The temperature dependences of the pitch and dielectric constant were determined, and the results were presented on a DC field-induced second harmonic generation in these mixtures.

Reversible tuning of the reflection color of chiral nematic liquid crystals by electric fields has long been a holy grail of the liquid crystal display applications. To date, low field ($E<1V/\mu m$) tuning of the reflection band has only been reported in the oblique heliconical chiral nematic phase of flexibly bent LC dimers, where $K_{33}<K_{22}$. Similar tuning was demonstrated using magnetic fields. On the other hand, in rectangular chiral nematic materials, electrical tuning of reflected color has been demonstrated in polymer stabilized liquid crystals and in chiral nematic samples with an in-plane electrode geometry, but in both cases the fields required are relatively large ($E>1V/\mu m$).

Therefore, there is a need in the art for chiral ferroelectric nematic liquid crystals having a chirality-induced stabilization of the polar nematic order, improved relaxation time for electro-optical switching, and selective reflection in the visible wavelength that is reversibly tunable to offer applications for reflecting LC displays, smart windows, filters, lasers, and e-paper displays.

SUMMARY OF THE INVENTION

An embodiment of the present invention provides a doped ferroelectric nematic liquid crystal having a chirality-induced stabilization of the polar nematic order, improved relaxation time for electro-optical switching, and selective reflection in the visible wavelength that is reversibly tunable. The ferroelectric nematic liquid crystal is doped with a chiral dopant selected from the group benzoic acid, 4-hexyl-,4-[[(1-methylheptyl)oxy]carbonyl]phenyl ester (ZLI811) and BDH1281 having the formula

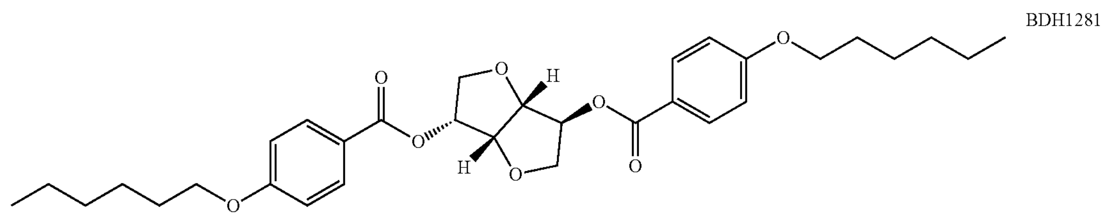 [SMILES: CCCCCCOc1ccc(C(=O)O[C@H]2CO[C@H]3[C@@H]2OC[C@H]3OC(=O)c2ccc(OCCCCCC)cc2)cc1]

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF ILLUSTRATIVE EMBODIMENTS

Figure 1A:
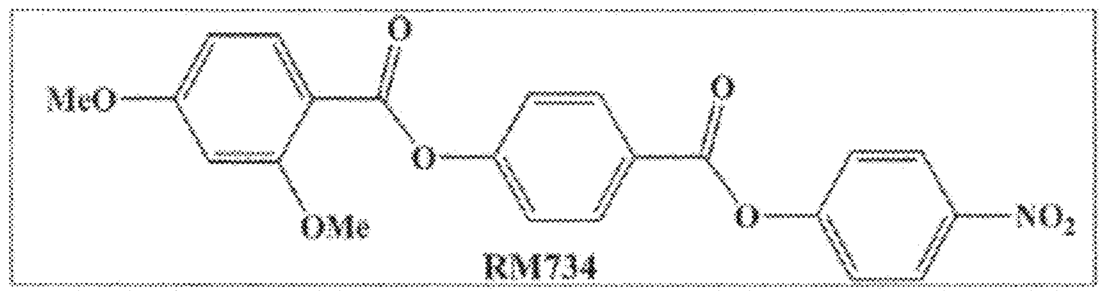
FIG. 1*a* shows the chemical structure of RM734.

The present invention discloses electrical, optical, and electro-optical properties in the chiral nematic N* and ferroelectric nematic $N_F$* phases of 4-[(4-nitrophenoxy) carbonyl]phenyl2,4-dimethoxybenzoate (RM734) doped with at least one non-polar chiral dopants, such as benzoic acid, 4-hexyl-,4-[[(1-methylheptyl)oxy]carbonyl]phenyl ester (ZLI811) and BDH1281 having the formula

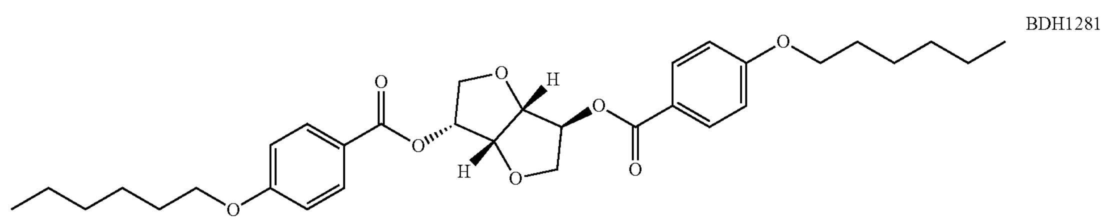 [SMILES: CCCCCCOc1ccc(C(=O)O[C@H]2CO[C@H]3[C@@H]2OC[C@H]3OC(=O)c2ccc(OCCCCCC)cc2)cc1]

It has been discovered that although the $N_F$ phase of pure RM734 is monotropic, the $N_F$ phase is enantiotropic, indicating a chirality-induced stabilization of the polar nematic order. It has also been shown that there is a remarkable improvement of the relaxation time for electro-optical switching in chiral-doped RM734 of the present invention relative to that in pure RM734. Furthermore, in the $N_F$* phase of a RM734+2% of a BDH1281 mixture exhibits selective reflection in the visible wavelengths that is reversibly tunable by 0.02-0.10 V/μm in-plane electric fields that offer applications for reflecting LC displays, smart windows, shutters, filters, lasers, and e-paper displays.

Although the application discusses the use of RM734 as the ferroelectric nematic liquid crystal, any substances that show the ferroelectric nematic phase will work with the present invention.

Table 1 below shows the phase transition temperatures and estimated pitch values of RM734 with different chiral dopants and at different chiral dopant concentrations. To estimate the pitch, the number of colored bands k in cells where the pure RM734 was put in contact with the chiral dopants in a d=9 μm thick cell at 135° C. was counted. The pitch was then determined using the formula $p_K$=2d/k. Based on this data; the helical twisting power (HTP) was determined (HTP=$(p\times c)^{-1}$) for each dopant used. ZLI811 with RM734 was found to have an HTP of 20 $\mu m^{-1}$, and even the addition of the ZLI811 at 4 wt. % gave a pitch over 1 μm. BDH1281 with RM734 was found to have an HTP at a sub-micrometer level (about 160 $\mu m^{-1}$) that produced a selective reflection in the visible wave range. The HTP of both ZLI811 and BDH1281 with RM734 is about 50% larger than the corresponding values with the well-known nematic liquid crystal 4-cyano-4'-pentylbiphenyl (5CB), which indicates that the twist elastic constant of RM734 is about ⅔ that of 5CB, or about a $K_{22}$ of 2 pN.

TABLE 1

| Material (wt %) | Phase Sequence Heating (° C.) | Phase Sequence Cooling (° C.) | Pitch (μM) |
|---|---|---|---|
| RM734 | Cr – 144 – N – 189 – Iso | Iso – 189 – N – 133 – $N_F$ | Infinite |

TABLE 1-continued

| Material (wt %) | Phase Sequence Heating (° C.) | Phase Sequence Cooling (° C.) | Pitch (μM) |
|---|---|---|---|
| RM734 + 1.0% ZLI811 | Cr − 135 − N* − 193 − Iso | Iso − 193 − N* − 133 − $N^*_F$ | 5.0 |
| RM734 + 2.5% ZLI811 | Cr − 90 − $N^*_F$ − 132 − N* − 193 − Iso | Iso − 190.5 − N* − 133 − $N^*_F$ | 2.0 |
| RM734 + 4.0% ZLI811 | Cr − 90 − $N^*_F$ − 123 − N* − 186 − Iso | Iso − 185 − N* − 124 − $N^*_F$ | 1.3 |
| RM734 + 2.0% BDH1281 | Cr − 90 − $N^*_F$ − 123 − N* − 191 − X − 197 − Iso | Iso − 195 − N* − 124 − $N^*_F$ | 0.32 |
| RM734 + 2.5% BDH1281 | Cr − 90 − $N^*_F$ − 123 − N* − 191 − X − 196 − Iso | Iso − 195 − N* − 122 − $N^*_F$ | 0.25 |

Polar Optical Microscopy images of these mixtures in 9.5 μm thick films with planar alignments were also taken. In the chiral nematic phases, uniform colors with increasing numbers of oily streaks at decreasing helical pitch values were seen, indicating that the helix axes are aligned perpendicular to the substrates. Similar textures with a shift in the color and an increase in the number of Grandjean lines were also observed in the chiral ferroelectric nematic phases.

The birefringence are the refractive indices measured with the electric vector of the light being parallel (perpendicular to the director) of undoped RM734 and doped RM734 were measured between crossed circular polarizers. Their temperature dependences were then plotted. With the undoped RM734, the birefringence increased on cooling to 0.21 in the N phase, then after a small jump at the N=$N_F$ transition, it further increased to over 0.24. With RM734 doped with 2.5% ZLI811, the jump at the N*− $N_F$* transition was larger than with the undoped RM734, but the measured birefringence was smaller by about 0.04. This decrease is likely due to the about 2 μm pitch, which is not quite within the Mauguin limit, and thus, the polarization of the light does not completely follow the director.

With the RM734 doped with 2% BDH1281, which showed a selective reflection in the visible wavelength, the birefringence was determined from the width of the reflection spectra, where the pitch was measured from the Grandjean-Cano wedge cell. The pitch decreased upon cooling in the N* phase, after some maxima of a few degrees below the N*−$N_F$* transition, it increased in the entire $N_F$*, which is typical for cholesteric materials with an underlying layered phase. This indicated an increasing twist elastic constant $K_{22}$ on cooling, perhaps due to the increasing size of the cybotactic clusters.

The textural variations in a 9.5 μM planar aligned cells of undoped RM734 and doped RM734 under various electric fields were compared. Over 0.02 V/μm fields, the director and ferroelectric polarization structures were uniform along the electric field. For the case when the polarizer is parallel to the field, stripes separated by defect lines ran parallel to the field and the rubbing direction. At zero applied fields, only parts of the stripes were dark between the crossed polarizers, indicating the director is tilted away from the stripe directions. This showed that the director structure was inhomogeneous, consisting of differently twisted domains at the zero electric field.

When the textural variations of the doped RM734 was studied (specifically RM734 doped with 2 wt. % BDHI281), textures in transmission between crossed polarizers at ±0.18 V/μm and 0.00 V/μm showed with a reddish color. Textures in reflection without polarizers at the same fields showed a green reflection independent of the applied voltage. In contrast to this, in the $N_F$* phase, the films showed electric field-dependent reflection colors. At 110° C. the reflection color varied from brown at the ±0.18 V/μm field, to green at the 0 V/μm field, through to orange and yellowish color at intermediate states in-between.

The electric switching of the chiral doped mixtures was also studied by applying 200 Hz voltages across in-plane electrodes or between electrodes on top and bottom substrates in a thin sandwich cell. In the ferroelectric chiral nematic phase of all mixtures, high enough in-plane fields could uniformly switch the director parallel to the field, leading to uniform planar textures. The BDHI281 mixtures required a higher electric field to be fully switched, but they aligned more uniformly than the ZLI811 mixtures.

For polarization measurements, 200 Hz triangular voltages were applied between in plane electrodes separated by a 1 mm gap in 9.5 μm planar cells with directors parallel to the applied fields. Additionally, the time dependence of the measured polarization current that was used to calculate the polarization values at 200 Hz, for a 2% BDHI281 mixture at 110° C. was determined. Instantaneous polarization values were also determined by integrating the current vs time values and plotting it with respect the actual field at that time. This therefore represented the instantaneous polarization; also known as the electric field looped within one period of a 200 Hz triangular field. This showed a typical ferroelectric hysteresis indicating that the switching at 200 Hz 0.18V/μm triangular field happened between two ferroelectric states without reformation of the helical structures.

The dependences of the peak areas (effective polarization) of undoped RM734 and four chiral doped mixtures on an amplitude of the 200 Hz triangular electric field were plotted. For the undoped RM734 and its mixtures with ZLI811 where the pitch was greater than 1 μm, the polarization was zero below E=0.03V/μm, while increasing steeply for E 0.03-0.07V/μm, where it began to saturate. The threshold for the net polarization appeared to be independent of the helical pitch, i.e., it was not due to the helix unwinding, but rather was determined by an antiferroelectric-type arrangement of the ferroelectric polarization and the energy needed to destroy the defect walls separating the domains with opposite polarization direction. For the 2 wt. % BDHI281 mixture where the pitch was about 0.3p m, the threshold field for the net polarization was larger, Eth of about 0.08V/μm, indicating that it corresponded to the helix unwinding field E. This gave us a $K_{22}$ of the 2 wt. % BDHI281 mixture of about 8 pN. This value is several times larger than in the N phase of the undoped RM734, consistent with the observed increase of the pitch in the $N_F$* phase.

The temperature dependences of the polarizations measured at 0.18V/μm fields, which provided the saturated polarization ($P_s$) above 100° C. for all the mixtures were plotted. The largest saturated polarization is ~6 μC $cm^2$ for the undoped RM734. The maximum saturated polarizations of the ZLI811 doped mixtures were practically the same as for the undoped RM734, whereas with the 2 wt. % BDH1281 mixture, the polarization reached only 4.5 μC/$cm^2$. Since this is a saturated value, it indicated a chiral dopant-induced decrease of the polar order. The saturated polarization showed a continuous increase on cooling down to 100° C. Below 100° C., the saturation field becomes larger than the applied field, due to the increasing viscosity and Frank elastic constant, causing the apparent polarization to decrease.

For the reversal switching time (ΔT) measurements, the full width of the polarization peak at half maxima was measured and plotted following stepwise field reversals of ±0.075V/μm for the different chiral dopants and concentrations at various temperatures. We found that the rise time, t (the time interval the polarization current rises to its maximum value) decreased with decreasing pitch values from t=0.22 ms at 0% chiral dopant to t=0.11 ms at 2 wt. % chiral dopants. The ON time and OFF times upon turning ON and OFF 0.16 V/μm were also plotted. While the ON times of the 0 wt. % and 2 wt. % BDHI281 compounds were essentially the same (about 0.2 ms), the relaxation to the OFF state was found to be much slower for undoped RM734. This can be seen by comparing the t(0 wt. %) of about 1.7 ms and the t(2 wt. %) of about 0.6 ms, but even more so when the time for full switching were compared, which was 10 ms for undoped RM734, and only 1.5 ms for the 2 wt. % BDHI281 doped mixture.

The date collected demonstrated that the reflection spectrum of RM734 doped with 2% BDH1281 was reversibly tunable in the $N^*_F$ phase under an applied in-plane field, while it was insensitive to the field in the N* phase. The data additionally showed that the spectra at different amplitudes of a 200 Hz triangular electric field showed a remarkable tuning of the reflection spectrum between 530 nm and 680 nm in the $N^*_F$ phase under applied electrical fields up to 0.1 V/μm. The reflective colors of the samples varied from green to reddish before the reflection disappeared at 0.12 V/μm, which is where the chiral helix was unwound). As the field amplitude increased from 0 to 0.03 V/μm, where the effective polarization was found to be small, the peak position of the reflected spectra shifted slightly to higher values. The field dependence was strongest between 0.03 V/μm and 0.09 V/μm, similar to the increase in the effective polarization measured under the same 200 Hz applied triangle-wave voltage. The sequence of reflected colors reversed without any observable hysteresis when the field was reduced. Around 0.06 V/μm a second, a weaker reflection peak appeared at about 400 nm and shifted to about 480 nm as the applied field was raised to 0.12 V/μm. The behavior shown was similar to that of triangular fields, except that it required smaller fields due to the larger effective values of the square-wave signals.

When reviewing the wavelength dependences of reflectivity at various in-plane DC fields, the primary peak position again shifted to longer wavelengths as the field amplitude increased, like the results for 200 Hz triangular waveforms, but the peaks were wider and the second, shorter wavelength peak was not observed. When reviewing a 3D plot of the frequency dependencies of the reflection spectra at 110° C. under a 0.08 V/μm triangular wave field, the shorter wavelength peak appeared only in the 100 Hz-400 Hz frequency range. At higher frequencies (>1000 Hz), there was only one higher intensity reflection peak that did not shift with voltage, indicating that the ferroelectric polarization cannot switch at these frequencies and that the sample responded only via the quadratic dielectric coupling to the field. It was noted that for the of RM734 doped with 2% BDH1281, the color shift started at 400 nm, and that tuning was therefore possible over a wider voltage range.

The present invention has shown that a polar rod-shape liquid crystal, possessing ordinary nematic and ferroelectric nematic phases, forms chiral nematic and chiral ferroelectric nematic phases when doped with non-polar chiral dopants. While the non-polar chiral dopants have a relatively minor effect on the birefringence and on the saturated ferroelectric polarization, the helical pitch behaves very differently in the N* and N*F phases. Most importantly, the helical pitch, and consequently the color of reflected light from the helical director structure, can be tuned in the N*F phase under 0.02-0.1 V/μm electric fields, which are 100 times smaller than in conventional N* materials. A simple model qualitatively described this tuning in the N*F phase by considering only the twist elastic energy, the polar (ferroelectric) interaction energy, and free boundary conditions on the azimuthal orientation of the director. Although tunable only at elevated temperatures, room temperature ferroelectric cholesteric materials, are expected to show similar low electric field driven, fast tuning, and a selective reflection of visible light in the N*F phase. The observed effect, therefore, has great potential applications on LC displays without backlight that for example, may be used for low power reflecting traffic lights, smart windows, shutters, filters, lasers, and e-paper displays without complicated sequential driving scheme.

In light of the foregoing, it should be appreciated that the present invention significantly advances the art by providing a doped chiral ferroelectric nematic liquid crystal with an electrically tunable reflection color that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Figure 1B:
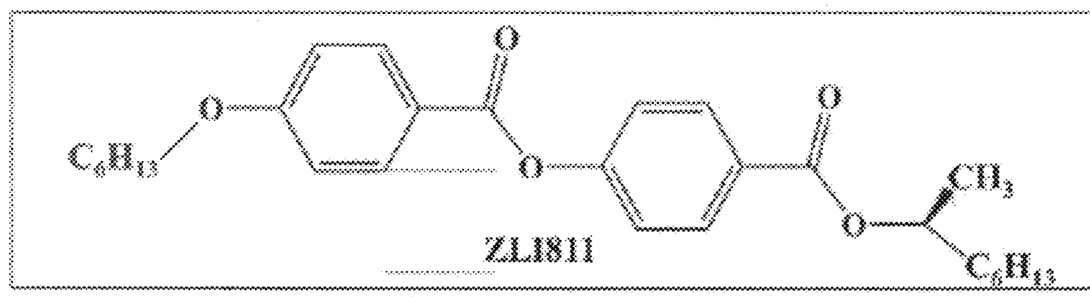
FIG. 1*b* shows the chemical structure of ZLI811.
Figure 1C:
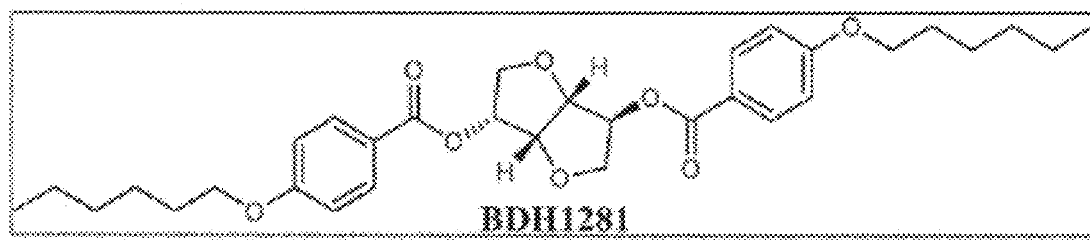
FIG. 1*c* shows the chemical structure of BDH1281.

The chemical structure of RM734, ZLI811 and BDH1281 are shown in FIGS. 1*a*, 1*b*, and 1*c*, respectively. The rod like molecule RM734 is achiral and does not form chiral structures by itself, so two non-polar chiral dopants, ZLI811 and BDH1281 from Merck Chemicals were selected to form a chiral structure with the RM734. ZLI 811 has relatively small helical twisting power (HTP), but its chemical structure is similar to the host material RM734, thus providing good solubility. BDH1281 has much larger HTP allowing for short pitch to be reached that shows selective reflection in the visible wavelength range at low concentrations. Which aids in finding the electric field tunability of the color.

Concentration gradients were achieved by inserting the pure parent liquid crystal at one side of an empty cell with constant thickness d and the liquid crystal with a fixed chiral dopant concentration c from the opposite side. After the fluids meet at the center, the material was heated to the isotropic phase, allowing for partial diffusion of the chiral material. Aa band texture was formed with the individual bands separating areas with pitch $p_i=2d/i$ and $p_{i+1}=2d/(i+1)$ (i=1, 2, . . . ). Knowing the film thickness and the concentration c at the edge, the helical twisting power (HTP) can be determined. In an example wherein d=9 μm with a c=0.025 at 135° C., p/2d=1/9, i.e., p=2 μm. Since HTP=$(p\cdot c)^{-1}$ in this cas3, HTP was about 20 $\mu m^{-1}$.

Figure 2:
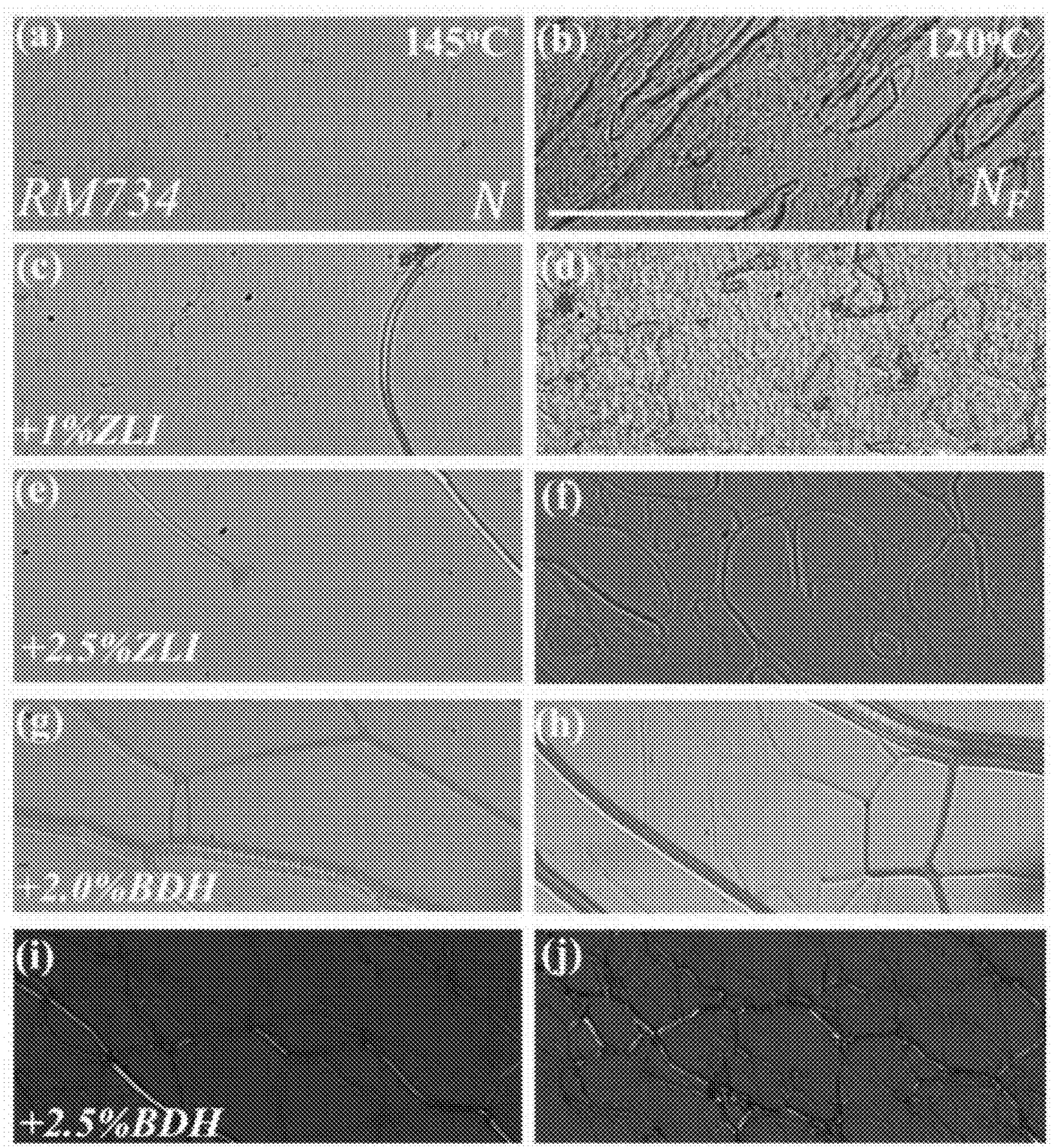
FIG. 2 shows Polarized Optical Microscopy (POM) measurements, wherein (a) shows a POM of a pure RM734 sample in the N phase; (b) shows a POM measurement of a pure RM734 sample in the $N_F$ phase on cooling; (c) shows a POM measurement of a 1% ZLI811 doped RM734 sample in the N* phase; (d) shows a POM measurement of a 1% ZLI811 doped RM734 sample in the $N*_F$ phase on cooling; (e) shows a POM measurement of a 2.5% ZLI811 doped RM734 sample in the N* phase; (f) shows a POM measurement of a 2.5% ZLI811 doped RM734 sample in the $N*_F$ phase on cooling; (g) shows a POM measurement of a 2% BDH1281 doped RM734 sample in the N* phase; (h) shows a POM measurement of a 2% BDH1281 doped RM734 sample in the $N*_F$ phase on heating; (i) shows a POM measurement of a 2.5% BDH1281 doped RM734 sample in the N* phase; and (j) shows a POM measurement of a 2.5% BDH1281 doped RM734 sample in the $N*_F$ phase on heating.

For Polarized Optical Microscopy (POM) measurements, a 9.5 μm thick sample cell was placed in an Instec HS2000 heat stage and viewed through crossed polarizers with an Olympus BX60 microscope. FIG. 2, images (a) through (j), show representative POM textures of films of substances with different chiral dopants and concentrations. Textures of the pure RM734 in the N phase is shown in image (a); pure RM734 in the $N_F$ phase is shown in (b) on cooling; 1% ZLI811 doped RM734 in the N* is shown in image (c); 1% ZLI811 doped RM734 in the $N^*_F$ phase is shown in image (d) on cooling; 2.5% ZLI811 doped RM734 in the N* phase is shown in image (e); 2.5% ZLI811 doped RM734 in the $N^*_F$ phase is shown in image (f) on cooling; 2% BDH1281 doped RM734 in the N* phase is shown in image (g); 2% BDH1281 doped RM734 in the $N^*_F$ phase is shown in image (h) on heating; 2.5% BDH1281 doped RM734 in the N* phase is shown in image (i); and 2.5% BDH1281 doped RM734 in the $N^*_F$ phase is shown in image (j) on heating. It can be seen from these images that the chiral doped mixtures shown more uniform colors and textures than that of the pure RM734, especially with the 2.5% ZLI811 and 2% BDH1281 doped materials.

Textures during electric switching of chiral doped mixtures were studied by applying 200 Hz voltages across the in-plane electrodes or between electrodes on the top and bottom substrates. The electric voltages were applied by a function generator (HP 33120A) and amplified by an amplifier (FLC E20AD). In-plane 0.160/μm fields applied parallel to the rubbing direction, that makes a 450 with respect to the crossed polarizers, cannot switch the pure RM734 in the nematic phase at 145° C.) but instead resulted in textural changes for all chiral materials. Notably for the 2% BDH1281 sample, the focal conical helix structures transferred to be planar by the applied in-plane field.

In the ferroelectric nematic phase, all samples showed the director can be fully switched parallel to a 160V/mm in-plane field at 120° C. The director of pure RM734 and the ZLI811 doped mixtures started rotating at 0.03V/μm in plane field, then were fully switched with 0.06V/μm. Ordered dark stripes perpendicular to 0.03V/μm fields indicated a helical axis tilted with respect to the field. Full switching of the 2% BDH1281 mixtures required higher voltages to reach fully polarized states but were more uniformly aligned.

POM textures with 200 Hz triangular fields applied across the substrates with planar alignment of 7 μm thick films of the 2.5% ZLI811 and 2% BDH1281 mixtures were created. As seen with the 2.5% ZLI811 mixture, oily streaks (helix axis normal to the substrates) switched to a fingerprint texture (helical axis being parallel or oblique to the substrates) and then the helix unwinds only above 6V. This showed that breaking the anchoring costs less energy than unwinding the helix. For the 2% BDH1281 mixture, the switching at 20V showed color changes indicating the onset of realignment and unwinding.

Electric current measurements carried out using triangular or rectangular waveform electric signals generated using a HP 33120A function generator and amplified by FLC F20AD amplifier were created. The current was monitored using a 20 kΩ resistor connected in series in the circuit. The time dependence of the measured polarization current that was used to calculate the polarization values for a 200 Hz, for 2% BDH1281 mixture at 110° C. was plotted. Instantaneous polarization values were computed by integrating the current vs time values from the plot of the time dependence of the measured polarization current and plotting it with respect to the actual voltage at that time. This therefore represented the polarization—field loop within one period of the 200 Hz triangular field between 0.18 V/μm and +0.18 V/μm fields. This showed a typical ferroelectric hysteresis indicating that the switching at 200 Hz 0.18 V/μm triangular field happens between two ferroelectric states without reformation of the helical structures. The largest polarization value (or saturated value) of the P-E loop is the effective polarization values of any constant frequency electric field switching.

The time dependence of the polarization reversal current for pure RM734 and for 3 different chiral mixtures were plotted. The reversal time that is defined as the full width at half maxima of the current peak are similar for the pure RM734 and its mixtures with ZLI811 (about 0.5 ms), while it dropped to about 0.3 ms for the 2% BDH1281 mixture. The rise time that is determined by the peak position of the polarization current was also smallest for the 2% BDH1281 mixture. The temperature dependence of the rise time under 0.076 V/μm amplitude square wave fields was also plotted. While the ON times were similar for the pure RM734 and the 2% BDH1281 mixture, the OFF time was much slower and has a long tail for the Pure RM734 that vanishes only after 10 ms while the 2% BDH1281 sample had an OFF time of only 1 ms.

The electric field tuning of the selective reflection of the 2% BDH1281 mixture under 200 Hz square wave fields at 110° C. was plotted and it was shown that the reflected peak can be tuned between 520 nm and 680 nm with less voltages (under 0.07 V/μm). The reflection spectrum of the 2.5% BDH1281 sample at 110° C. under 200 Hz triangular voltages had color shifts from 450 nm to 580 nm by applying a 0.12 V/μm field.

What is claimed is:

1. A liquid crystal cell comprising a doped ferroelectric nematic liquid crystal including a ferroelectric nematic liquid crystal doped with a chiral dopant, wherein the chiral dopant is selected from benzoic acid, 4-hexyl-,4-[[(1-methylheptyl)oxy]carbonyl]phenyl ester and the formula

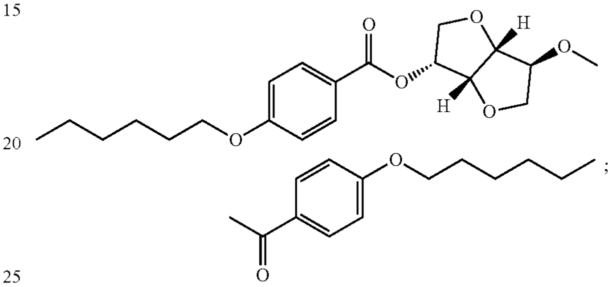

and electrodes for providing an in-plane electric field of from 0.02 V/μm to 0.10 V/μm;

wherein the doped ferroelectric nematic liquid crystal is reversibly tunable with application of the in-plane electric field of from 0.02 V/μm to 0.10 V/μm.

2. The liquid crystal cell of claim 1, wherein the chiral dopant is present at a weight percent of from 1 wt. % to 4 wt. %.

3. The liquid crystal cell of claim 1, wherein the chiral dopant is present at a weight percent of 2 wt. %.

4. The liquid crystal cell of claim 1, wherein the chiral dopant is present at a weight percent of 2.5 wt. %.

5. The liquid crystal cell of claim 1, wherein the doped ferroelectric nematic liquid crystal is in the N*F phase.

6. A method of tuning the liquid crystal cell of claim 1, the method comprising providing the liquid crystal cell of claim 1; and applying the in-plane electric field of from 0.02 V/μm to 0.10 V/μm across the electrodes, thereby tuning the doped ferroelectric nematic liquid crystal.

7. The method of claim 6, wherein the ferroelectric nematic liquid crystal is 4-[(4-nitrophenoxy)carbonyl]phenyl2,4-dimethoxybenzoate.

8. The method of claim 6, wherein the chiral dopant is present at a weight percent of from 1 wt. % to 4 wt. %.

9. The method of claim 6, wherein the chiral dopant is present at a weight percent of 2 wt. %.

10. The method of claim 6, wherein the chiral dopant is present at a weight percent of 2.5 wt. %.

11. The method of claim 6, wherein the doped ferroelectric nematic liquid crystal is in the N*F phase.

12. A liquid crystal cell comprising a doped ferroelectric nematic liquid crystal including a ferroelectric nematic liquid crystal doped with a chiral dopant, wherein the chiral dopant is present at a weight percent of from 1 wt. % to 4 wt. %, wherein the doped ferroelectric nematic liquid crystal is in the N*F phase, wherein the ferroelectric nematic liquid crystal is 4-[(4-nitrophenoxy)carbonyl]phenyl2,4-dimethoxybenzoate, wherein the chiral dopant is selected from benzoic acid, 4-hexyl-,4-[[(1-methylheptyl)oxy]carbonyl]phenyl ester and the formula

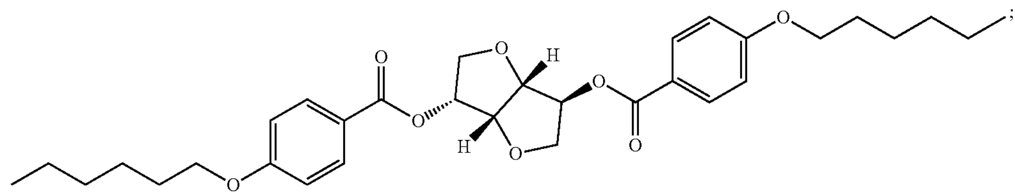 [SMILES: CCCCCCOc1ccc(C(=O)O[C@H]2CO[C@H]3[C@@H]2OC[C@H]3OC(=O)c2ccc(OCCCCCC)cc2)cc1]

and electrodes for providing an in-plane electric field of from 0.02 V/μm to 0.10 V/μm;

wherein the doped ferroelectric nematic liquid crystal is reversibly tunable with application of the in-plane electric field of from 0.02 V/μm to 0.10 V/μm.

13. The liquid crystal cell of claim 12, wherein the chiral dopant is present at a weight percent of 2 wt. %.

14. The liquid crystal cell of claim 12, wherein the chiral dopant is present at a weight percent of 2.5 wt. %.

15. The liquid crystal cell of claim 1, wherein the ferroelectric nematic liquid crystal is 4-[(4-nitrophenoxy)carbonyl]phenyl2,4-dimethoxybenzoate.

* * * * *